United States Patent

Uejima et al.

[11] Patent Number: 5,805,371
[45] Date of Patent: Sep. 8, 1998

[54] MONITORING TAPE POSITION IN A MAGNETIC RECORDING/REPRODUCING APPARATUS

[75] Inventors: Takamasa Uejima, Ichihara; Tohru Minagawa, Kashiwa, both of Japan

[73] Assignee: Sharp Kabushiki Kaisha, Osaka, Japan

[21] Appl. No.: 626,411

[22] Filed: Apr. 2, 1996

[30] Foreign Application Priority Data

Apr. 25, 1995 [JP] Japan .................................. 7-101227

[51] Int. Cl.⁶ .................................................. G11B 15/18
[52] U.S. Cl. ...................... 360/72.3; 360/72.2; 360/73.05
[58] Field of Search ................................. 360/72.2, 72.3, 360/73.05, 73.04, 73.06, 74.1, 74.2, 74.4, 74.5, 74.6, 73.07

[56] References Cited

U.S. PATENT DOCUMENTS

| | | | |
|---|---|---|---|
| 4,636,880 | 1/1987 | Debell | 360/72.3 |
| 5,179,479 | 1/1993 | Ahn | 360/72.3 X |
| 5,195,000 | 3/1993 | Suzuki | 360/72.3 |
| 5,475,542 | 12/1995 | Bentley et al. | 360/72.3 X |
| 5,638,229 | 6/1997 | Shingu et al. | 360/72.3 |

FOREIGN PATENT DOCUMENTS

| | | |
|---|---|---|
| 0280217 | 8/1988 | European Pat. Off. . |
| 0306274 | 3/1989 | European Pat. Off. . |
| 0580253 | 1/1994 | European Pat. Off. . |
| 61-105751 | 5/1986 | Japan . |
| 64-453391 | 3/1989 | Japan . |
| 64-453392 | 3/1989 | Japan . |
| 4-271045 | 9/1992 | Japan . |
| 5-128816 | 2/1993 | Japan . |
| 5-128817 | 5/1993 | Japan . |
| 6-60618 | 3/1994 | Japan . |
| 6-84331 | 3/1994 | Japan . |
| 2258939 | 6/1992 | United Kingdom . |
| WO 81/01902 | 7/1981 | WIPO . |

*Primary Examiner*—Andrew L. Sniezek

[57] ABSTRACT

A magnetic recording/reproducing apparatus includes a mechanism body, a control circuit, and a memory circuit. The mechanism body has a loading mechanism, a tape traveling mechanism, and a reel revolution count detection mechanism for outputting a signal corresponding to a revolution count of the reel. The control circuit drive-controls the loading mechanism and the tape traveling mechanism, calculates a cumulative revolution count of the reel from an output of the reel revolution count detection mechanism, and controls recording and reproduction of data, including a video signal and a track number, on and from the magnetic tape. The memory circuit stores the cumulative revolution count of the reel and the track number upon recording and reproduction of the data on and from the magnetic tape. The control circuit reads out form the memory circuit a cumulative revolution count of the reel corresponding to a track number of a target position to which the magnetic tape is to be positioned, compares the readout cumulative revolution count with the cumulative revolution count of the reel of the magnetic tape that travels in a non-contact state with respect to the rotary drum, and positions the magnetic tape.

5 Claims, 7 Drawing Sheets

MONITORING TAPE POSITION IN A MAGNETIC RECORDING/REPRODUCING APPARATUS

BACKGROUND OF THE INVENTION

(1) Field of the Invention

The present invention relates to a rotary head type magnetic recording/reproducing apparatus for converting a video signal and an audio signal into digital data and recording and reproducing the digital data on and from a magnetic tape and, more particularly, to a magnetic recording/reproducing apparatus capable of accurately detecting the current position of the magnetic tape.

(2) Description of the Prior Art

Conventionally, various methods have been proposed to detect the current position of a magnetic tape when fast-forwarding or rewinding the magnetic tape at a high speed. For example, a method of detecting the current position by optically measuring the thickness of the magnetic tape wound on a reel, a method of detecting the current position from a ratio of the revolution count of the supply reel to that of the take-up reel, a method of detecting the current position by using a linear track on the magnetic tape, and a method of detecting the current position by reading with a rotary head information written on a track on the magnetic tape are proposed.

Among these methods, according to the method of detecting the current position of the magnetic tape by reading information on a track number written on a region on part of a track on the magnetic tape, during fast-forwarding or rewinding, the magnetic tape must be traveled at a high speed while it is wound on a rotary drum.

Figure 1:
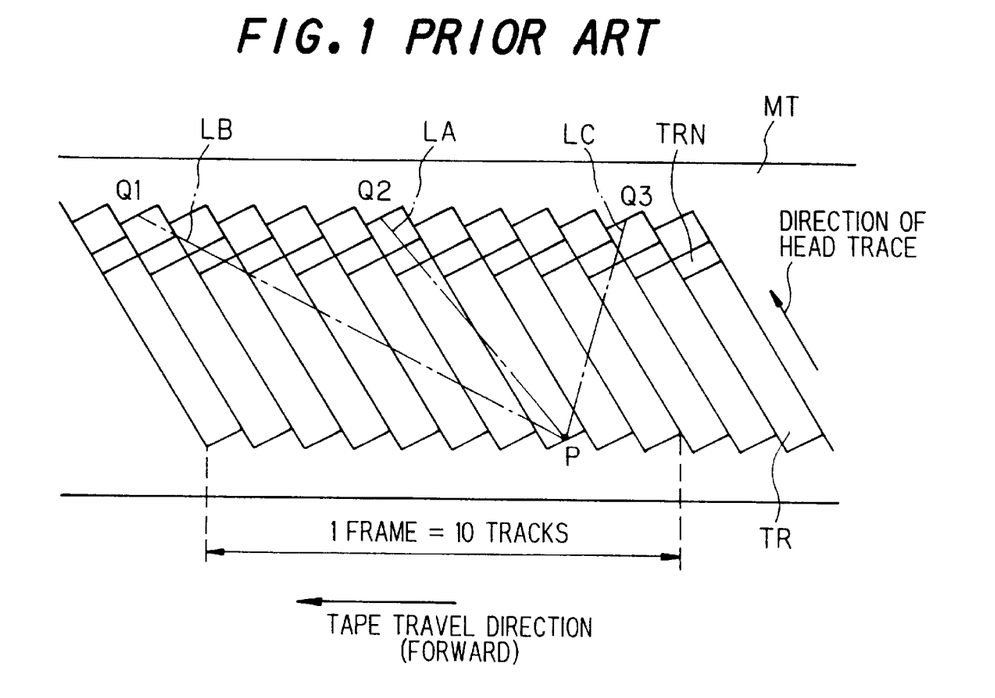
FIG. 1 is a diagram showing the relationship between the track pattern and the head traces of a magnetic tape.
Figure 2A:
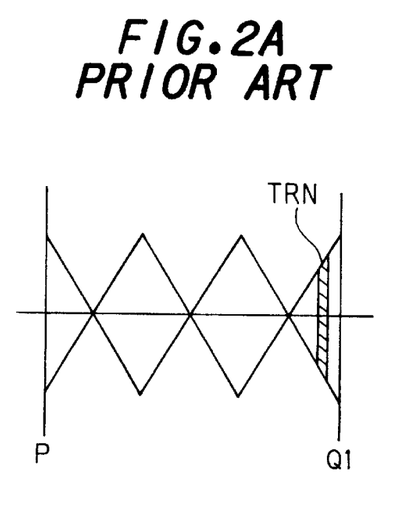
FIG. 2A is a waveform chart showing an envelope waveform during rewinding when the tape travels at a high speed.
Figure 2B:
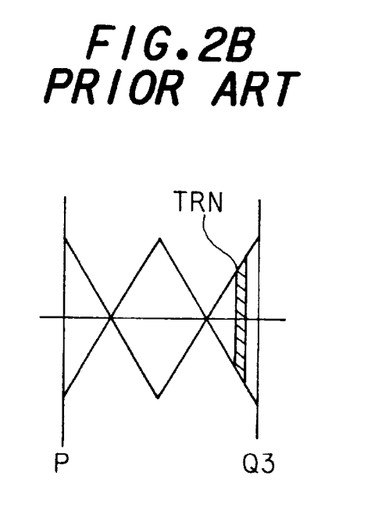
FIG. 2B is a waveform chart showing an envelope waveform during fast-forwarding when the tape travels at a high speed.

FIG. 1 shows a track pattern on a magnetic tape MT. According to a digital magnetic recording/reproducing apparatus, a one-frame video signal is recorded as it is divided into 10 tracks, and a region TRN where a track number is to be written is set on a region of part of each track TR. Referring to FIG. 1, a chain line LA represents a head trace during recording/reproduction, a chain line LB represents a head trace during rewinding, and a chain line LC represents a head trace during fast-forwarding. FIGS. 2A and 2B show the envelope waveforms of signals read by the rotary head when the tape travels at a high speed, in which FIG. 2A shows an envelope waveform in the rewinding mode, and FIG. 2B shows an envelope waveform in the fast-forward mode.

When the magnetic tape is to be fast-forwarded or rewound while it is wound on the rotary drum, the take-up reel is driven against the load of a guide post that guides the magnetic tape or a tension post. Thus, extra power consumption is required accordingly, interfering with an increase in speed of tape feeding.

During high-speed traveling, variations in load of the guide post degrade the contact of the magnetic tape and rotary head, so that it is difficult to read the track number stably. For this reason, a direct drive method of driving the reel with a motor directly is taken for consideration, but it leads to a large increase in cost. As a countermeasure for this, it is preferable that the magnetic tape be fast-forwarded or rewound while it is not wound on the rotary drum. In this case, however, the track number written on the magnetic tape cannot be read, and thus the current position of the magnetic tape cannot be detected.

Therefore, an apparatus is proposed which measures the rotation period of the reel, calculates the current position of the magnetic tape and the cumulative revolution count of the reel from the measurement result, and controls the position of the magnetic tape (for example, refer to Japanese Patent Application Laid-Open Hei 4 No. 271045). Even with this apparatus, however, the current position of the magnetic tape and the cumulative revolution count of the reel cannot be accurately detected due to the influence of variations in diameter of the hub of the reel or non-uniform winding of the magnetic tape.

SUMMARY OF THE INVENTION

It is an object of the present invention to provide a magnetic recording/reproducing apparatus that can accurately detect the position of a magnetic tape even when the magnetic tape is fast-forwarded or rewound while it is not wound on the rotary drum.

According to the first aspect of the present invention, there is provided a magnetic recording/reproducing apparatus comprising: a mechanism body having a loading mechanism for mounting a magnetic tape in a cassette case loaded therein with respect to a rotary drum in a contact state or in a non-contact state, a tape traveling mechanism for driving the magnetic tape to travel between a pair of reels, and reel revolution count detection means for outputting a signal corresponding to a revolution count of the reel; a control circuit for drive-controlling the loading mechanism and the tape traveling mechanism, calculating a cumulative revolution count of the reel from an output of the reel revolution count detection means, and controlling recording and reproduction of data, including a video signal and a track number, on and from the magnetic tape; and a memory circuit for storing the cumulative revolution count of the reel and the track number upon recording and reproduction of the data on and from the magnetic tape, wherein the control circuit reads out, from the memory circuit, a cumulative revolution count of the reel corresponding to a track number of a target position to which the magnetic tape is to be positioned, compares the readout cumulative revolution count with the cumulative revolution count of the reel of the magnetic tape that travels in a non-contact state with respect to the rotary drum, and positions the magnetic tape.

According to the second aspect of the present invention, there is provided a magnetic recording/reproducing apparatus, wherein the cumulative revolution count of the reel and the track number are stored in the memory circuit, in the first aspect of the present invention, at arbitrary sampling intervals, and the control circuit comprises means for interpolating a cumulative revolution count of the reel and the track number which are included in a period missed from sampling.

According to the third aspect of the present invention, there is provided a magnetic recording/reproducing apparatus, wherein the interpolating means according to the second aspect of the present invention comprises means for calculating coefficients k1 and k2 satisfying $$k1=(\pi/P)\times t$$

$$k2=(\pi/P)\times D_0$$

where P is the track pitch in the tape feed direction, t is the thickness of the tape, and $D_0$ is the outer diameter of a hub of the reel, the coefficients K1 and K2 being calculated from an equation:

$$N_P = k1 \times n_P^2 + k2 \times n_P$$

where $n_P$ is at least two cumulative revolution counts of the reel obtained by sampling before and after one sampling period and $N_P$ is the corresponding track numbers of the tape, and means for calculating a cumulative revolution count $n_q$ of the reel and a track number $N_q$ of the tape of the period missed by sampling based on the calculated coefficients k1 and k2 from an equation:

$$N_q = k1 \times n_q^2 + k2 \times n_q$$

According to the fourth aspect of the present invention, there is provided a magnetic recording/reproducing apparatus, wherein the interpolating means according to the second aspect of the present invention comprises means for calculating coefficients k1 and k2 satisfying $$k1 = (\pi/P) \times t$$

$$k2 = (\pi/P) \times D_o$$

where P is the track pitch in the tape feed direction, t is the thickness of the tape, and $D_o$ is the outer diameter of a hub of the reel, the coefficients K1 and K2 being calculated from arbitrary several track numbers and cumulative revolution counts of the reel among a series of information on cumulative revolution counts $n_R$ of the reel and track numbers $N_R$ of the tapes that are stored in the memory circuit, by using $$N_R = k1 \times n_R^2 + k2 \times n_R$$

and means for, when other track numbers $N_S$ and cumulative revolution counts $n_S$ of the reel that are not used for calculating the coefficients k1 and k2 are expressed, based on the calculated coefficients k1 and k2, as $$N_S = k1 \times n_S^2 + k2 \times n_S$$

deleting the series of track numbers and cumulative revolution counts of the reel stored in the memory when ejecting the magnetic tape from the mechanism body, except for those obtained when the tape is ejected, and newly recording coefficients k1 and k2.

According to the fifth aspect of the present invention, there is provided a magnetic recording/reproducing apparatus comprising means for, when the tape is to be rotated in one of forward and reverse directions in a region of the magnetic tape whose track number and cumulative revolution count of the reel are recorded according to the first aspect of the present invention, sampling and recording a cumulative revolution count of a take-up reel and a track number which is determined by a cumulative revolution count of a supply reel, or the track number recorded on the magnetic tape, in a memory unit other than the magnetic tape.

According to the sixth aspect of the present invention, there is provided a magnetic recording/reproducing apparatus comprising means for recording the track number, the cumulative revolution count of the reel, and the coefficients k1 and k2, all of which are obtained when the tape is ejected according to the fourth aspect of the present invention, on an optional track on the magnetic tape.

In the magnetic recording/reproducing apparatus according to the present invention, even when the magnetic tape is fast-forwarded or rewound while it is not in contact with the rotary drum, the cumulative revolution count of the reel and the track number of the magnetic tape are sampled and stored in the memory circuit in advance. Thus, positioning of the magnetic tape can be performed accurately by reproducing these pieces of information and comparing reproduced cumulative revolution count information of the reel which corresponds to the target track number subjected to positioning with the cumulative revolution count of the reel which is measured during positioning of the magnetic tape.

DESCRIPTION OF THE PREFERRED EMBODIMENTS

Figure 3:
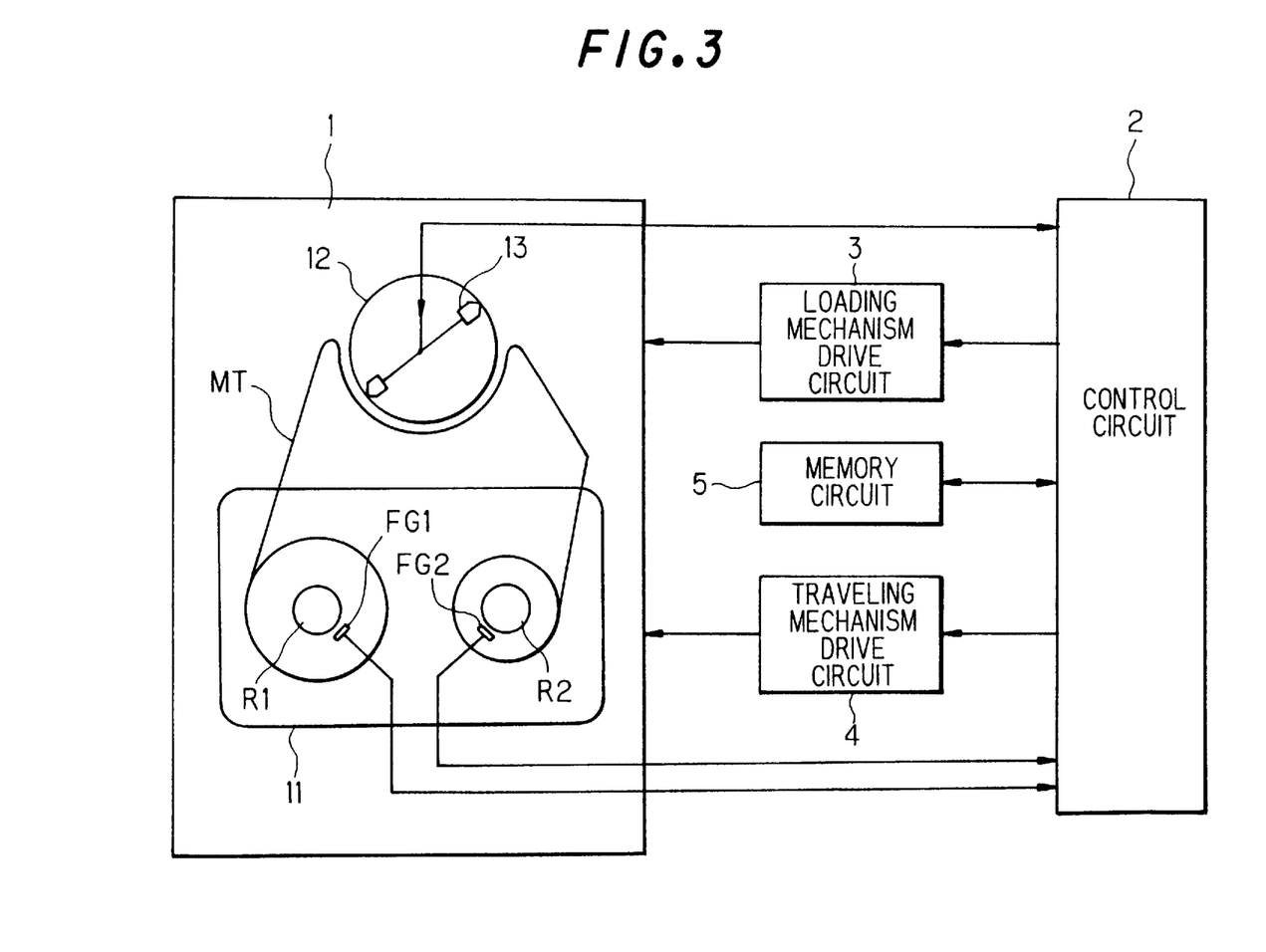
FIG. 3 is a block diagram showing a magnetic recording/reproducing apparatus according to an embodiment of the present invention.

FIG. 3 is a block diagram showing a magnetic recording/reproducing apparatus according to an embodiment of the present invention, which is a rotary head type digital VTR (video tape-recorder). This embodiment comprises a mechanism body 1 for storing a cassette case and a control circuit 2 for controlling the mechanism body 1. The mechanism body 1 has a loading mechanism for loading a magnetic tape MT in a cassette case 11 loaded in it on a rotary drum 12 or the like, and a tape traveling mechanism for causing the magnetic tape MT to travel.

The loading mechanism is controlled by a loading mechanism drive circuit 3, and the tape traveling mechanism is controlled by a traveling mechanism drive circuit 4. The loading mechanism drive circuit 3 and the traveling mechanism drive circuit 4 are controlled by the control circuit 2.

Digital data is written on the magnetic tape MT or the digital data recorded on the magnetic tape MT is read by a rotary head 13 mounted on the rotary drum 12. In the digital data recorded on the magnetic tape MT, 10 tracks of the magnetic tape MT constitute one frame, as described above, and information concerning a video signal, an audio signal, and the track number of each track are recorded on each track as the digital data.

Figure 4:
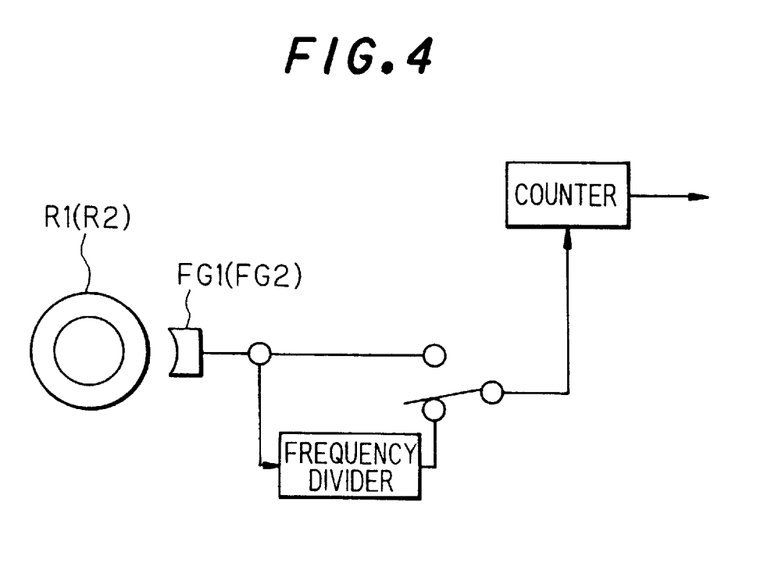
FIG. 4 is a block diagram showing switching between accurate counting in which an output pulse signal from a frequency generator is directly input to a counter and normal counting in which an output pulse signal is input to a counter after it is frequency-divided by a frequency divider.

Frequency generators FG1 and FG2 are arranged near the rotating shafts of a pair of reels R1 and R2 of the cassette case 11 to generate pulse signals having frequencies corresponding to the revolution counts of the reels R1 and R2. The pulse signals generated by the frequency generators FG1 and FG2 are supplied to the control circuit 2. The control circuit 2 calculates the cumulative revolution counts of the reels R1 and R2 by counting these pulse signals. In this case, as shown in FIG.4, selection can be made between accurate counting in which an output pulse signal from the frequency generator FG1 (FG2) is directly inputted to a counter and normal counting in which an output pulse signal is inputted to the counter after it is frequency-divided by a frequency divider. The reel R1 is a supply reel, and the reel R2 is a take-up reel. The control circuit 2 is connected to a memory circuit 5. The memory circuit 5 stores the track number recorded on each track of the magnetic tape MT and information concerning the cumulative revolution counts of the reels, as will be described later.

The operation of this embodiment will be described. First, an operation performed when a video signal and the like are recorded starting from the winding start position (point A) of the blank magnetic tape MT will be described with reference to the flow chart shown in FIG. 5. This operation is started when the cassette case 11 is loaded in the mechanism body 1 and the apparatus is set in the recording mode.

Figure 5:
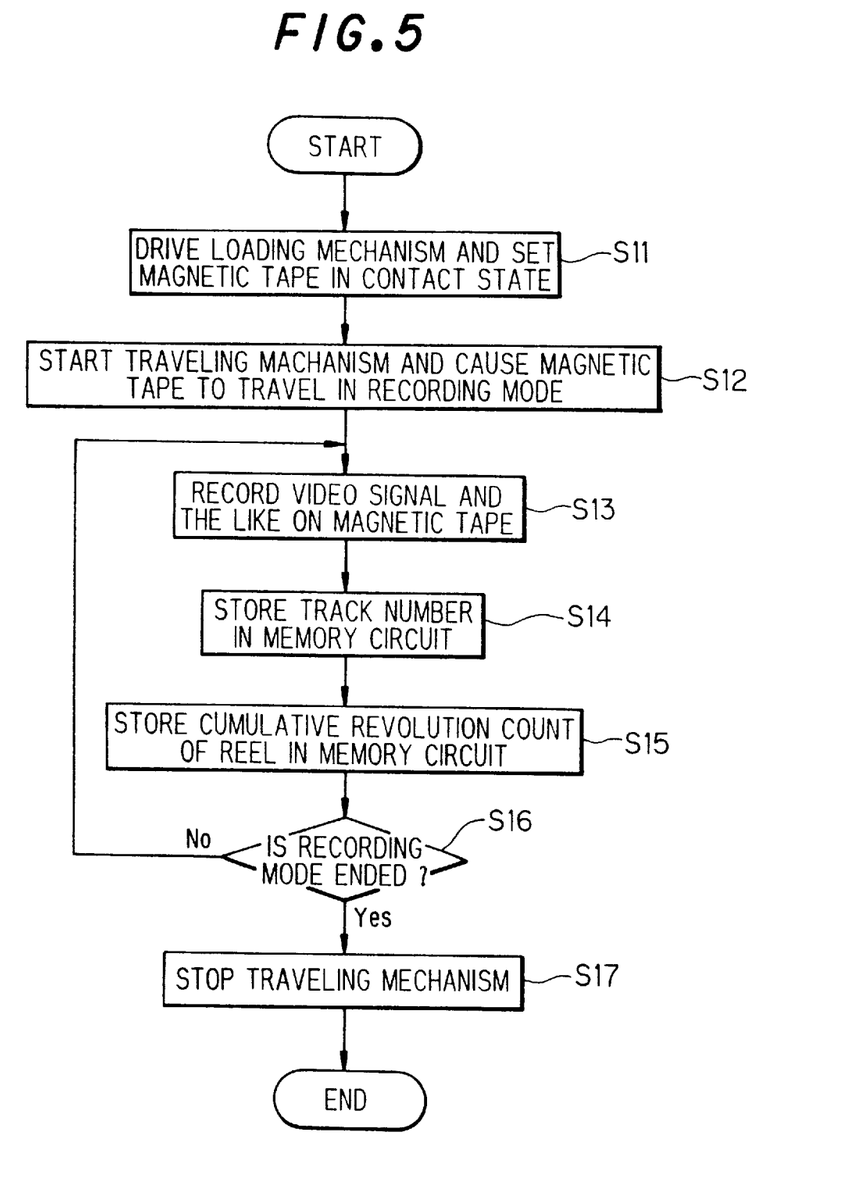
FIG. 5 is a flow chart for explaining an operation performed when a video signal and the like are recorded starting from the winding start position of a blank magnetic tape.

The loading mechanism drive circuit 3 drives the loading mechanism in the mechanism body 1 to pull the magnetic tape MT from the cassette case 11 and wind it on the rotary drum 12 in a contact state (step S11).

Subsequently, the start of the traveling mechanism in the mechanism body 1 is controlled by the traveling mechanism drive circuit 4, so that the magnetic tape MT travels from the supply reel R1 toward the take-up reel R2 through the rotary drum 12 in the recording mode (step S12). Thus, digital data representing a video signal, an audio signal, and the track number of each track that are output from the control circuit 2 are recorded on the magnetic tape MT by the rotary head 13 (step S13). Simultaneously, the track number to be recorded on the magnetic tape MT is stored in the memory circuit 5 with an arbitrary sampling period (step S14). Also, the revolution count of the take-up reel R2 is detected by the frequency generator FG2, and a pulse signal having a frequency corresponding to this revolution count is supplied to the control circuit 2. This pulse signal is counted by the counter in the control circuit 2, and is stored in the memory circuit 5 as the cumulative revolution count of the reel with an arbitrary sampling period (step S15). The processing operations in steps S13 to S15 are repeatedly executed until the recording mode is ended (step S16). When the recording mode is ended, the traveling mechanism drive circuit 4 controls to stop the traveling mechanism in the mechanism body 1 (step S17), thereby ending the processing operation.

Figure 6:
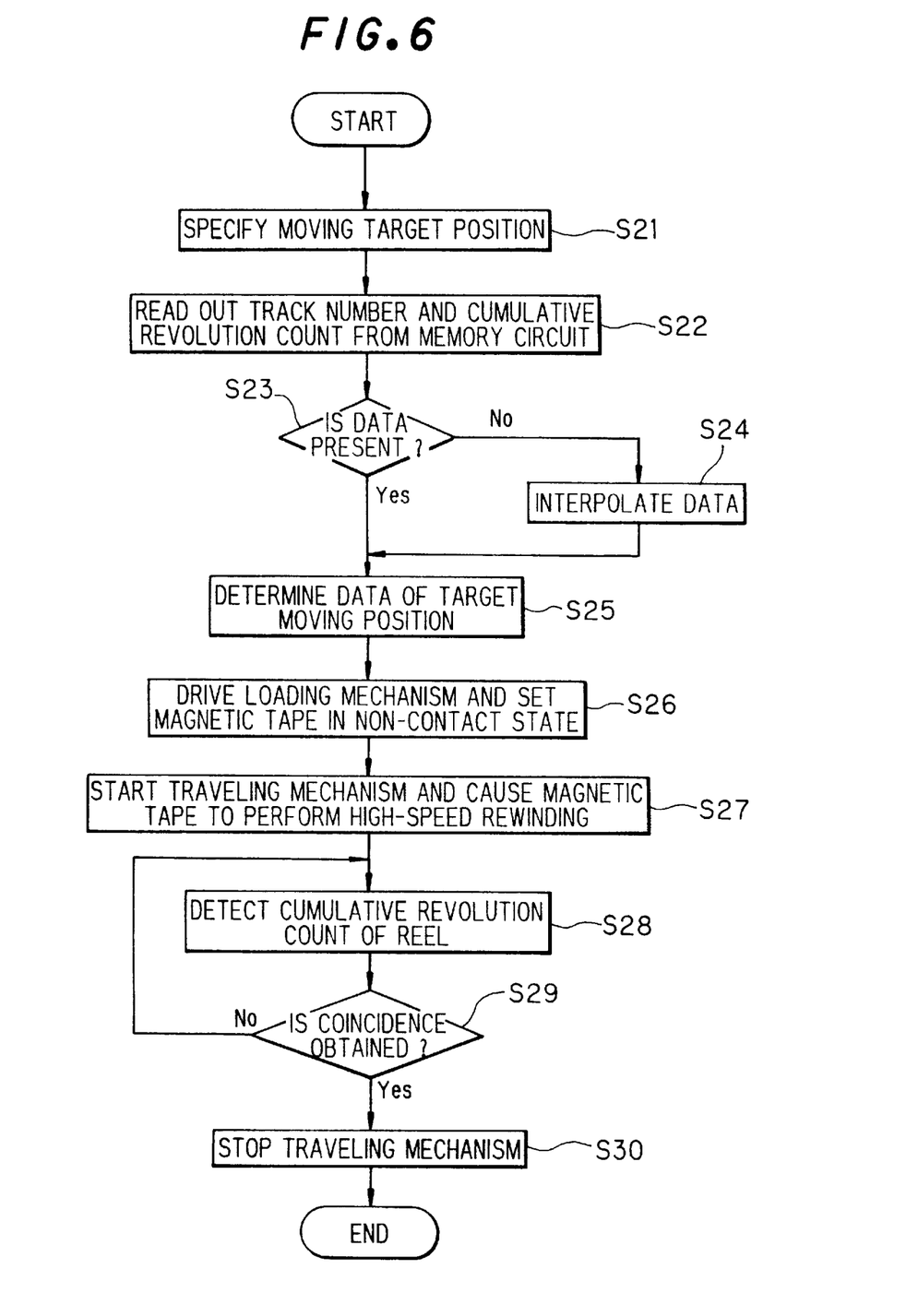
FIG. 6 is a flow chart for explaining an operation performed when, after the operation shown in FIG. 5 is completed, the tape is rewound within a recorded range.

An operation for rewinding the magnetic tape MT within the recorded range without ejecting the cassette case 11 from the mechanism body 1 and moving it to a specified position, after recording of the video signal, the audio signal, and the track signal onto the magnetic tape MT is ended and storage of the track number and the cumulative revolution count of the reel in the memory circuit 5 is ended, will be described with reference to the flow chart shown in FIG.6.

First, a position to which the magnetic tape MT is to be moved is specified (step S21). Subsequently, the track number and information concerning the cumulative revolution count of the reel, which are stored in the memory circuit 5, are read out (step S22), and it is determined whether the track number corresponding to the moving target position and information concerning the cumulative revolution count of the reel are stored (step S23).

If NO in step S23, interpolation is performed in accordance with the following procedure (step S24). The track number and information concerning the cumulative revolution count of the reel are stored in the memory circuit 5 every arbitrary sampling period, as described above. If the track number corresponding to the moving target position and information concerning the cumulative revolution count are missed due to sampling, they must be interpolated.

Defining the track number as N and the cumulative revolution count of the reel as n, coefficients k1 and k2 that satisfy $$k1=(\pi/P) \times t$$

$$k2=(\pi/P) \times D_o$$

are defined where P is the track pitch in the tape feed direction, t is the thickness of the tape, and $D_o$ is the outer diameter of the hub of the reel.

First, from at least two cumulative revolution counts $n_P$ of the reel obtained by sampling before and after one sampling period and the corresponding track numbers $N_P$ of the tape, the coefficients k1 and k2 are obtained by using the following equation:

$$N_P = k1 \times n_P^2 + k2 \times n_P$$

Subsequently, based on the calculated coefficients k1 and k2, a cumulative revolution count $n_q$ of the reel and a track number $N_q$ of the tape which are included in a period missed by sampling are calculated from the following equation:

$$N_q = k1 \times n_q^2 + k2 \times n_q$$

If the track number corresponding the moving target position and information concerning the cumulative revolution count of the reel are missed due to sampling, information that are obtained in the above manner are defined, and if they are sampled, information read out in step S22 are defined, as the information concerning the moving target position (step S25).

The loading mechanism in the mechanism body 1 is controlled by the loading mechanism drive circuit 3, and the magnetic tape MT is set in the non-contact state so as not to contact the rotary drum 12 (step S26). Then, the start of the tape traveling mechanism in the mechanism body 1 is controlled by the traveling mechanism drive circuit 4, and high-speed rewinding travel of the magnetic tape MT from the take-up reel R2 toward the supply reel R1 is commanded (step S27).

The cumulative revolution count of the rotating reel is detected (step S28), and this cumulative revolution count and the cumulative revolution count of the reel corresponding to the track number of the moving target position determined in step S25 are compared (step S29). The processing operations in steps S28 and S29 are repeated until the two cumulative revolution counts coincide. When the two cumulative revolution counts coincide, the traveling mechanism drive circuit 4 controls to stop the traveling mechanism in the mechanism body 1 (step S30), and the processing operation is ended. In this manner, positioning of the magnetic tape MT can be performed.

Figure 7:
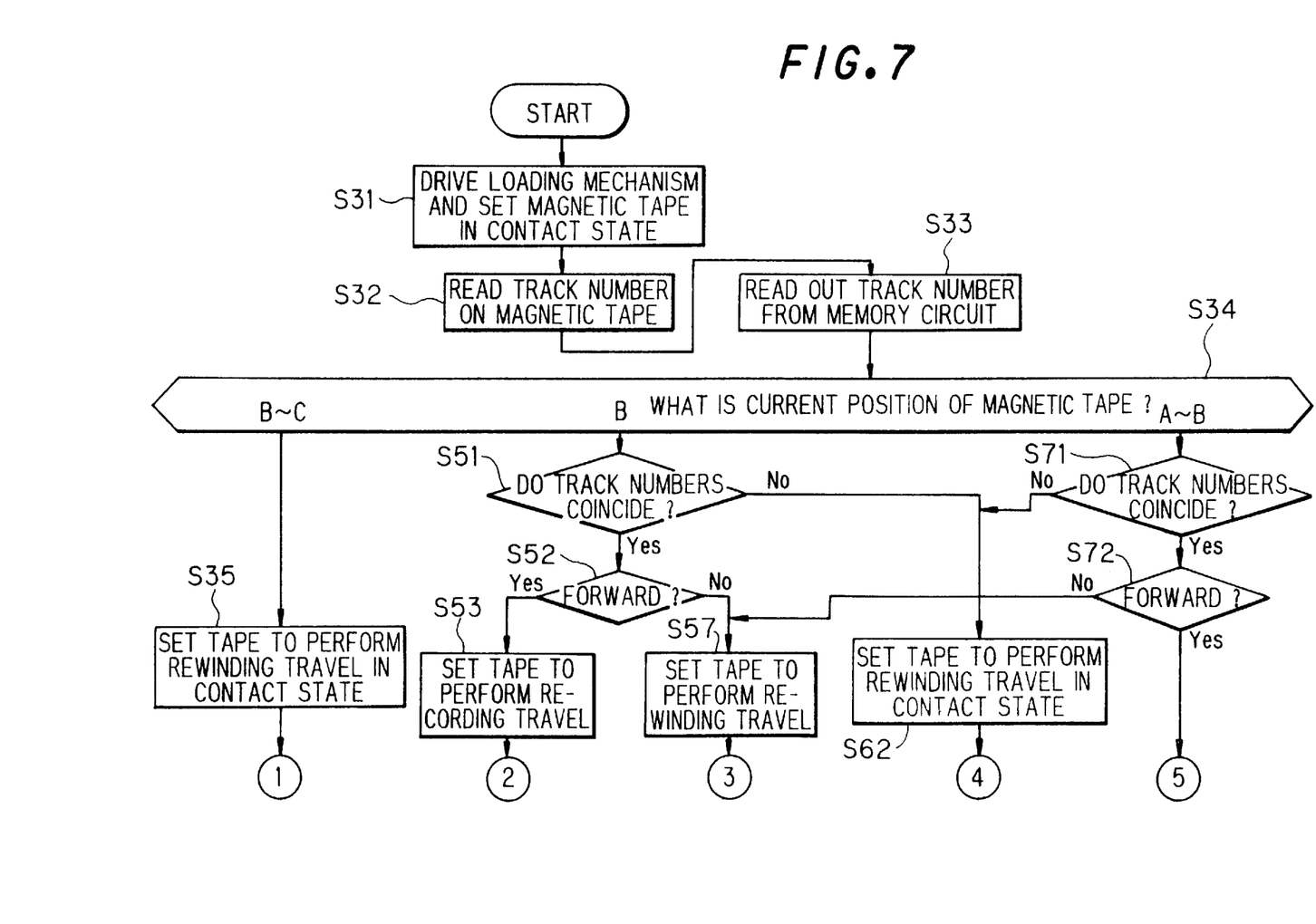
FIG. 7 is a flow chart for explaining an operation performed when a cassette case is ejected from a mechanism body and is loaded again in the mechanism body.
Figure 8:
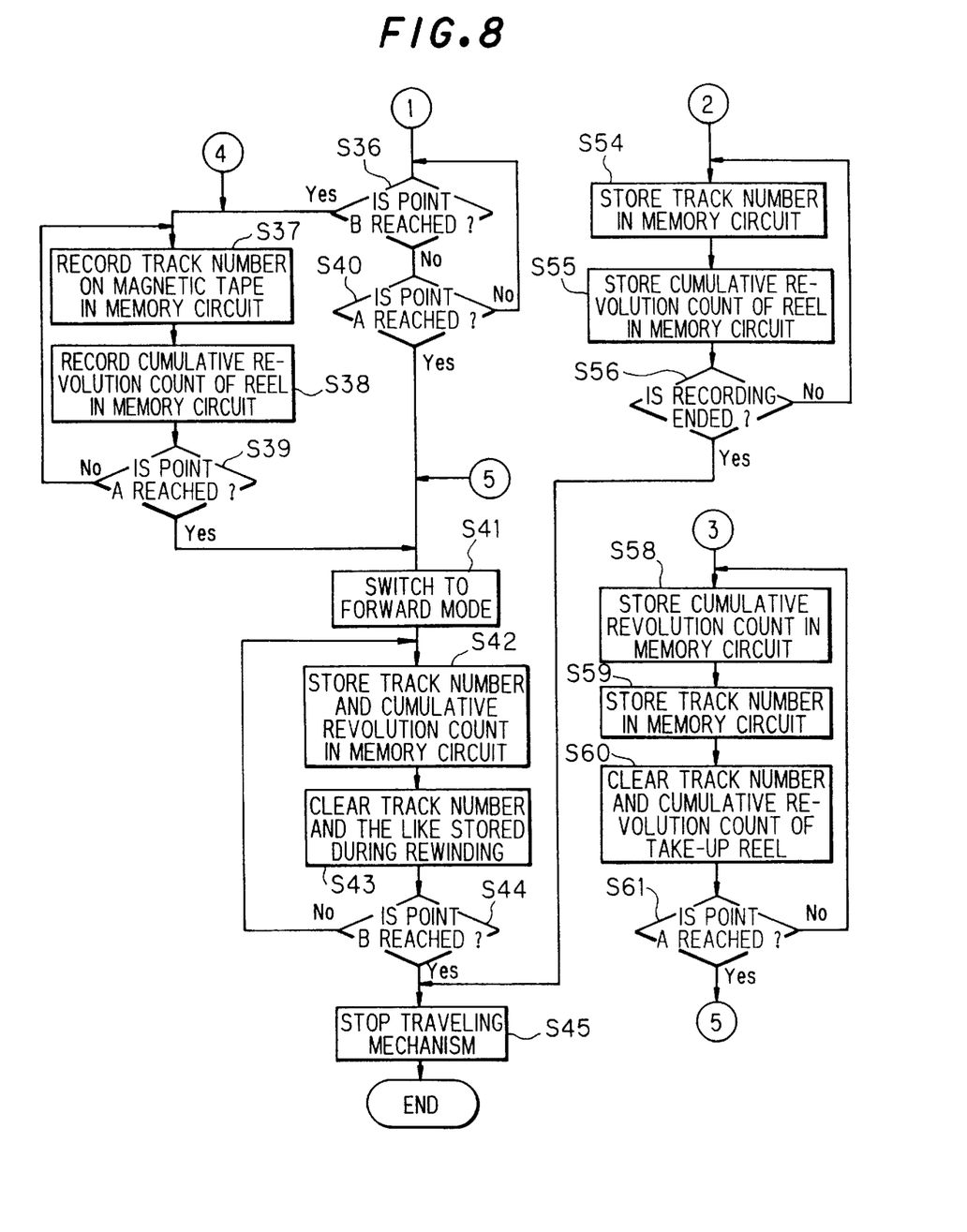
FIG. 8 is a flow chart for explaining an operation performed when the cassette case is ejected from the mechanism body and is loaded again in the mechanism body.

A sequence for storing the track number and information concerning the cumulative revolution count of the reel in the memory circuit 5, after the cassette case 11 is temporarily ejected from the mechanism body 1 and then loaded in the mechanism body 1 again, and an arbitrary mode is set, will be described with reference to the flow charts shown in FIGS. 7 and 8. The arbitrary mode to be set is, e.g., the recording mode, the reproduction mode, the fast-forward mode, the rewinding mode, or the like.

First, the loading mechanism drive circuit 3 controls the loading mechanism in the mechanism body 1 to pull the magnetic tape MT from the cassette case 11 and mount it on the rotary drum 12 in the contact state (step S31). Subsequently, the rotary drum 12 is rotated to read the track number recorded on the magnetic tape MT with the rotary head 13 (step S32).

The track number stored in the memory circuit 5 is read out (step S33). This track number is compared with the track number read from the magnetic tape MT in order to detect whether the current position of the magnetic tape MT is in a non-recorded region, on a boundary between the non-recorded region and a recorded region, or in the recorded region (step S34). In the following description, note that the winding start position of the magnetic tape MT is a point A, a winding end position is a point C, a region ranging from the point A to an intermediate point B is the recorded region, and a region ranging from the point B to the point C is the non-recorded region.

As the result of the determination in step S34, if the current position of the magnetic tape MT is in the non-recorded region (between points B and C), when the traveling mechanism drive circuit 4 controls the traveling mechanism in the mechanism body 1 and the magnetic tape MT is brought into contact with the rotary drum 12, the rewinding mode is set, and the start of traveling is commanded (step S35).

Thus, the magnetic tape MT is rewound from the take-up reel R2 toward the supply reel R1. When the current position of the magnetic tape MT reaches the boundary position (point B) between the non-recorded region and the recorded region (step S36), the track number recorded on the magnetic tape MT is read by the rotary head 13, and information on this track number is sampled and recorded in the memory circuit 5 (step S37). At the same time, the cumulative revolution count of the supply reel R1, i.e., the cumulative revolution count of the reel obtained by counting the signal pulses from the frequency generator FG1, is sampled and recorded in the memory circuit 5 as information of the supply reel R1 (step S38). Note that the counter for counting the cumulative revolution count has been reset.

This series of processing operations (steps S37 and S38) are performed until the winding start position (point A) of the magnetic tape MT (step S39). When the current position of the magnetic tape MT reaches the point A, or reaches the point A with the point B not being detected in step S36 (step S40), the traveling mechanism drive circuit 4 controls the tape traveling mechanism in the mechanism body 1 and switches the mode to either forward mode of recording, reproduction, fast-forwarding with the tape head being in the contact state, and fast-forwarding with the tape head being in the non-contact state (step S41).

The cumulative revolution count of the take-up reel R2, which is reset, and one of the track number on the magnetic tape MT, the track number determined by the cumulative revolution count of the supply reel R1, and the track number of the recording signal, are selected in accordance with the mode and sampled and stored in the memory circuit 5 as information on the take-up reel R2 (step S42).

At the same time, the track number of the supply side and information on the cumulative revolution count of the reel, which are stored in steps S37 and S38, are cleared from the memory circuit 5 sequentially (step S43). This series of processing operations (steps S42 and S43) are performed until the point B is reached (step S44). When the point B is reached, the traveling mechanism drive circuit 4 controls to stop the traveling mechanism in the mechanism body 1 (step S45), and the processing operation is ended.

Thus, a position in the region ranging from the point A to the point B on the magnetic tape MT is stored in the memory circuit 5 as information on the revolution counts of the pair of reels. When the magnetic tape MT is moved within this region again, the cumulative revolution counts of the reels are counted again, thereby eliminating a count error caused by non-uniform winding of the reel and the like.

In step S34, if it is determined that the current position of the magnetic tape MT is on the boundary (point B) between the non-recorded region and the recorded region, whether the track number on the magnetic tape MT coincides with the track number stored in the memory circuit 5 is determined (step S51). If YES in step S51, whether the feed direction of the magnetic tape MT is the forward mode is determined (step S52).

If YES in step S52, the recording mode is to be set with which recording is to be made in the non-recorded region. The traveling mechanism drive circuit 4 controls the traveling mechanism in the mechanism body 1 to set the recording mode (step S53). The track number to be recorded on the magnetic tape MT is also simultaneously sampled and stored in the memory circuit 5 (step S54). A cumulative revolution count obtained by counting the signal pulses from the frequency generator FG2 of the take-up reel R2 is sampled and stored in the memory circuit 5 (step S55). This processing operations in steps S54 and S55 are executed until recording is ended (step S56). When recording is ended, the traveling mechanism drive circuit 4 controls to stop the tape traveling mechanism in the mechanism body 1 (step S45), thereby ending the processing operation.

If the feed direction of the magnetic tape MT is the reverse direction (No in step S52), the traveling mechanism drive circuit 4 controls the traveling mechanism in the mechanism body 1 to set the rewinding mode with the tape head being in the contact state or in the non-contact state (step S57). The cumulative revolution count of the supply reel R1 is sampled and stored in the memory circuit 5 (step S58). When the tape head is in the contact state, the track number on the magnetic tape MT is stored, and when the tape head is in the non-contact state, the track number obtained from the cumulative revolution count of the take-up reel R2 is sampled and stored in the memory circuit 5 (step S59). At the same time, the track number of the take-up reel R2 side and information on the cumulative revolution count of the reel are sequentially deleted from the memory circuit 5 and in due order (step S60).

This series of processing operations (steps S58 to S60) are executed until the winding start position (point A) of the magnetic tape MT. When the point A is reached (step S61), the traveling mechanism drive circuit 4 controls the traveling mechanism in the mechanism body 1 to switch the mode to the forward mode (step S41), and the processing operation starting from step S42 is executed.

In step S51, if it is determined that the track number on the magnetic tape MT is different from that in the memory circuit 5, the traveling mechanism drive circuit 4 controls the tape traveling mechanism in the mechanism body 1 to set the rewinding mode with the tape head being in the contact state (step S62). After this, the processing operation starting from step S37 is executed.

In step S34, if it is determined that the current position of the magnetic tape MT is in the recorded region, i.e., is between the points A and B, whether the track number on the magnetic tape MT coincides with the track number stored in the memory circuit 5 is determined (step S71). If YES in step S71, whether the feed direction of the magnetic tape MT is the forward mode is determined (step S72).

If YES in step S72, the processing operation starting from step S41 is executed. If NO in step S72, the processing operation starting from step S57 is executed. In step S71, if it is determined that the track number on the magnetic tape MT is different from that in the memory circuit 5, the processing operation starting from step S62 is executed.

A relation:

$$N = (\pi/P) \times t \times n^2 + (\pi/P) \times D_o \times n$$

is established where N is the track number, P is the track pitch in the tape travel direction, t is the thickness of the tape, n is the cumulative revolution count of the reel, and $D_o$ is the outer diameter of the hub of the reel. In general, the track pitch, the thickness of the tape, and the diameter of the hub of the reel differ from one cassette to another. If they are defined as constants, although the memory may be economized, the tape positioning precision will be degraded.

Therefore, the values of the coefficients k1 and k2 satisfying $$k1 = (\pi/P) \times t$$

$$k2 = (\pi/P) \times D_o$$

are calculated based on several track numbers and cumulative revolution counts of the reel in accordance with the method of least squares or the like. The track number and the cumulative revolution count of the reel are compared from the values k1 and k2 inversely. If the difference falls within a certain allowable range, the track number and information on the cumulative revolution count of the reel that are stored in the memory circuit 5 are deleted, while information concerning the position of the tape upon extraction, information on the start position of a region whose track number and information on the cumulative revolution count of the reel have been obtained, information on the end position, and the values of the coefficients k1 and k2 are left, so that the memory area of the memory circuit 5 can be economized.

In the equation concerning the track number N and the cumulative revolution count n of the reel, if the outer diameter $D_o$ of the hub of the reel is an arbitrary reel diameter on the take-up side in the reverse feed direction, information on the take-up side in the reverse feed direction can be dealt with by the same equation. When the coefficients k1 and k2 are defined differently on both reels, the relationship between a series of track numbers and cumulative revolution counts of the reel can be obtained accurately.

Due to the non-uniform thickness or non-uniform winding of the tape, if the series of track numbers and cumulative revolution counts of the reel cannot be correlated with each other with the set of coefficients k1 and k2, a plurality of sets of coefficients k1 and k2 may be defined in every appropriate tape section, so that the relationship between the track number and the cumulative revolution count of the reel can be obtained accurately.

If the sampling periods of the track number and cumulative revolution count of the reel can be set arbitrarily, the memory capacity of the memory circuit 5 can be economized. If the sampling periods are equal with the priority being given to the track number, information on the track number becomes unnecessary, so that the memory area of the memory circuit can be economized.

If the track number upon ejection of the magnetic tape, information on the cumulative revolution count of the reel, and the coefficients k1 and k2 are recorded on an optional track on the tape, the mechanism body having a reproduction function of the optional track allows a further reduction in memory capacity of the memory circuit.

According to the present invention, in the high-speed fast-forward or rewinding mode, the magnetic tape is not brought into contact with the rotary drum. Thus, an increase or variations in load of the guide post can be suppressed. Since a series of track numbers of the magnetic tape are obtained from the cumulative revolution counts of the reel obtained by the frequency generator, error factors in controlling the position of the magnetic tape, e.g., variations in reel diameter, non-uniform winding of the tape, non-uniform thickness of the tape, and the like, can be eliminated, so that positioning of the magnetic tape can be performed accurately.

What is claimed is:

1. A magnetic recording/reproducing apparatus comprising:

a tape traveling mechanism for driving a magnetic tape to travel between a pair of reels, and reel revolution count detection means for outputting a signal corresponding to a revolution count of at least one of said reels;

a control circuit for drive-controlling said tape traveling mechanism, calculating a cumulative revolution count of said reel from output of said reel revolution count detection means, and controlling recording and reproduction of data, including a track number, on and from said magnetic tape; and a memory circuit for storing the cumulative revolution count of said reel and the track number upon recording and reproduction of the data on and from said magnetic tape;

wherein said control circuit reads out, from said memory circuit, a cumulative revolution count of said reel corresponding to a track number of a target position to which said magnetic tape is to be positioned, compares the read out cumulative revolution count with the cumulative revolution count of said reel, and positions said magnetic tape, and further wherein the cumulative revolution count of said reel and the track number are stored in said memory circuit at arbitrary sampling intervals, and the control circuit comprises means for interpolating a cumulative revolution count of said reel and the track number which are included in a period missed from sampling.

2. A magnetic recording/reproducing apparatus according to claim 1, wherein said interpolating means comprises means for calculating coefficients k1 and k2 satisfying $$k1 = (\pi/P) \times t$$

$$k2 = (\pi/P) \times D_o$$

where P is the track pitch in the tape feed direction, t is the thickness of said tape, and $D_o$ is the outer diameter of a hub of said reel, the coefficients K1 and K2 being calculated from an equation:

$$N_P = k1 \times n_P^2 + k2 \times n_P$$

where $n_P$ is at least two cumulative revolution counts of said reel obtained by sampling before and after one sampling period and $N_P$ is the corresponding track numbers of said tape, and means for calculating a cumulative revolution count $n_q$ of said reel and a track number $N_q$ of said tape of the period missed by sampling based on the calculated coefficients k1 and k2 from an equation:

$$N_q = k1 \times n_q^2 + k2 \times n_q.$$

3. A magnetic recording/reproducing apparatus according to claim 1, wherein said interpolating means comprises
means for calculating coefficients k1 and k2 satisfying $$k1 = (\pi/P) \times t$$

$$k2 = (\pi/P) \times D_o$$

where P is the track pitch in the tape feed direction, t is the thickness of said tape, and $D_o$ is the outer diameter of a hub of said reel,
the coefficients K1 and K2 being calculated from arbitrary several track numbers and cumulative revolution counts of said reel among a series of information on cumulative revolution counts $n_R$ of said reel and track numbers $N_R$ of said tapes that are stored in said memory circuit, by using $$N_R = k1 \times n_R^2 + k2 \times n_R$$

and
means for, when other track numbers $N_S$ and cumulative revolution counts $n_S$ of said reel that are not used for calculating the coefficients k1 and k2 are expressed, based on the calculated coefficients k1 and k2, as $$N_S = k1 \times n_S^2 + k2 \times n_S$$

deleting the series of track numbers and cumulative revolution counts of said reel stored in said memory when ejecting said magnetic tape from said mechanism body, except for those obtained when said tape is ejected, and newly recording coefficients k1 and k2.

4. A magnetic recording/reproducing apparatus according to claim 3, further comprising means for recording the track number, the cumulative revolution count of said reel, and the coefficients k1 and k2, all of which are obtained when said tape is ejected, on an optional track on said magnetic tape.

5. A magnetic recording/reproducing apparatus according to claim 1, further comprising means for, when said tape is to be wound fast in one of forward and reverse directions in a region of said magnetic tape whose track number and cumulative revolution count of said reel are recorded, recording, with an arbitrary sampling interval, a track number which is determined by a cumulative revolution count of a supply reel and a cumulative revolution count of a take-up reel, in a memory unit other than said magnetic tape.

* * * * *